Figure 1:
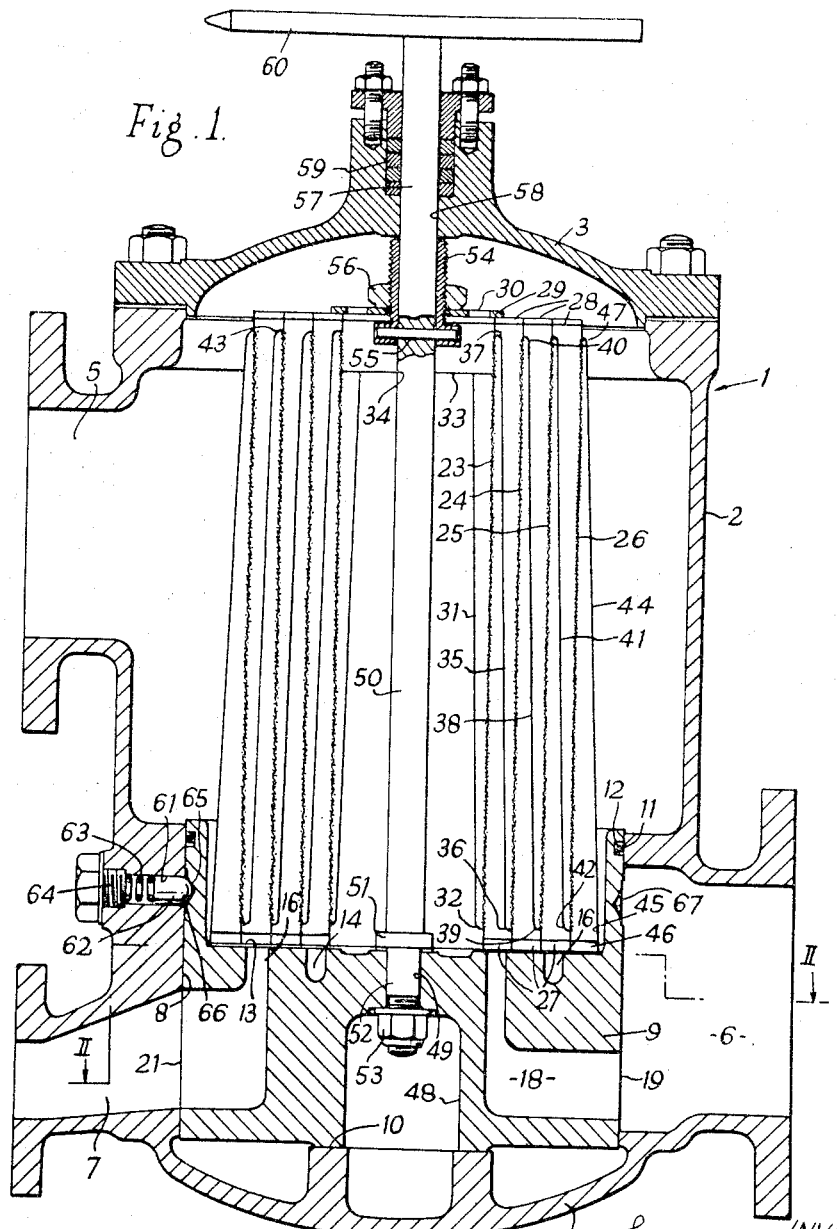

Oct. 11, 1966 L. W. ENGLISH 3,278,036
LIQUID FILTERING APPARATUS WITH CLEANING MEANS
Filed Aug. 16, 1963
3 Sheets-Sheet 1

INVENTOR
Leonard Walter English
BY
Karl W. Flocks
ATTORNEY

Oct. 11, 1966   L. W. ENGLISH   3,278,036
LIQUID FILTERING APPARATUS WITH CLEANING MEANS
Filed Aug. 16, 1963   3 Sheets-Sheet 2

INVENTOR
Leonard Walter English
BY
ATTORNEY

United States Patent Office 3,278,036
Patented Oct. 11, 1966

3,278,036
LIQUID FILTERING APPARATUS WITH CLEANING MEANS
Leonard Walter English, Sunbury-on-Thames, Middlesex, England, assignor to Auto-Klean Strainers Limited, Hounslow, England, a company of Great Britain
Filed Aug. 16, 1963, Ser. No. 302,538
Claims priority, application Great Britain, Aug. 17, 1962, 29,429/62
8 Claims. (Cl. 210—333)

This invention relates to liquid filtering apparatus.

Such apparatus is well known comprising an annular filter unit disposed within a housing having an inlet port communicating with one side of the unit and an outlet port communicating with the other side of the unit. It is frequently desired to arrange that the unit shall be refluxed for cleaning purposes and to this end a valve member may be provided capable of obturating the inlet port and at the same time connecting that side of the unit normally communicating with the inlet port to a reflux port. Thus filtered liquid flows from the outlet port back through the unit to the reflux port to wash away previously filtered material clinging to the inlet side of the unit. Such an arrangement has, for example, been employed with a casing accommodating a plurality of cylindrical units arranged in spaced apart relationship with their axes parallel any one of which may be selected for refluxing by providing a suitable valve. For some purposes this prior construction presents certain disadvantages in the size of casing required to accommodate units providing adequate liquid flow.

It is therefore an object of the present invention to provide an improved liquid filtering apparatus capable of being refluxed incorporating a number of filtering units and being of comparatively small size in relation to its flow capacity.

According to the present invention there is provided liquid filtering apparatus comprising a plurality of annular filtering units arranged one within the other inside a casing, one side of each unit communicating through a single valve block selectively with an inlet port of the casing and with a reflux port. Annular baffles may be provided between the units.

Preferably the units are cylindrical and of circular cross-sectional shape and are arranged concentrically one within the other. Advantageously, the valve block is circular in cross-sectional shape and is arranged concentrically of and at one end of the units and is rotatable with the units.

The inlet and reflux ports may communicate with the peripheral surface of the valve block and a plurality of passages may be formed through the valve block communicating respectively with its periphery and with its end face adjacent the units. Said end face is preferably formed with part circumferential grooves which communicate with the passages through the valve block and which are of a radius respectively to communicate with spaces between different ones of the units.

Alternatively the valve block may be hollow and its interior may communicate with a reflux port co-axial therewith.

Figure 2:
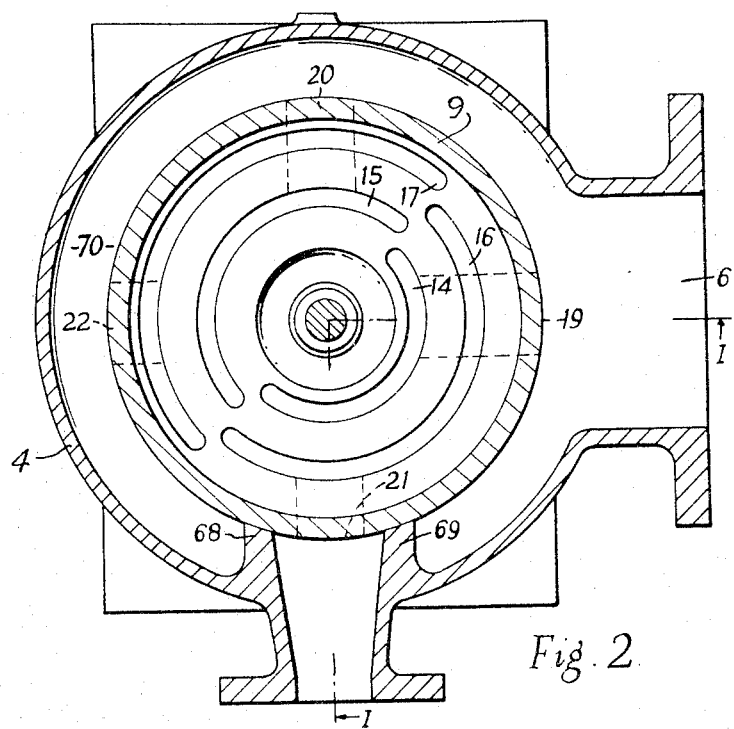
Figure 4:
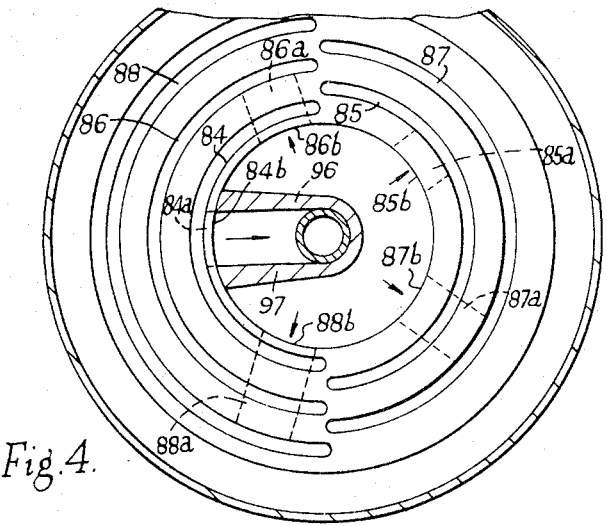
Figure 3:
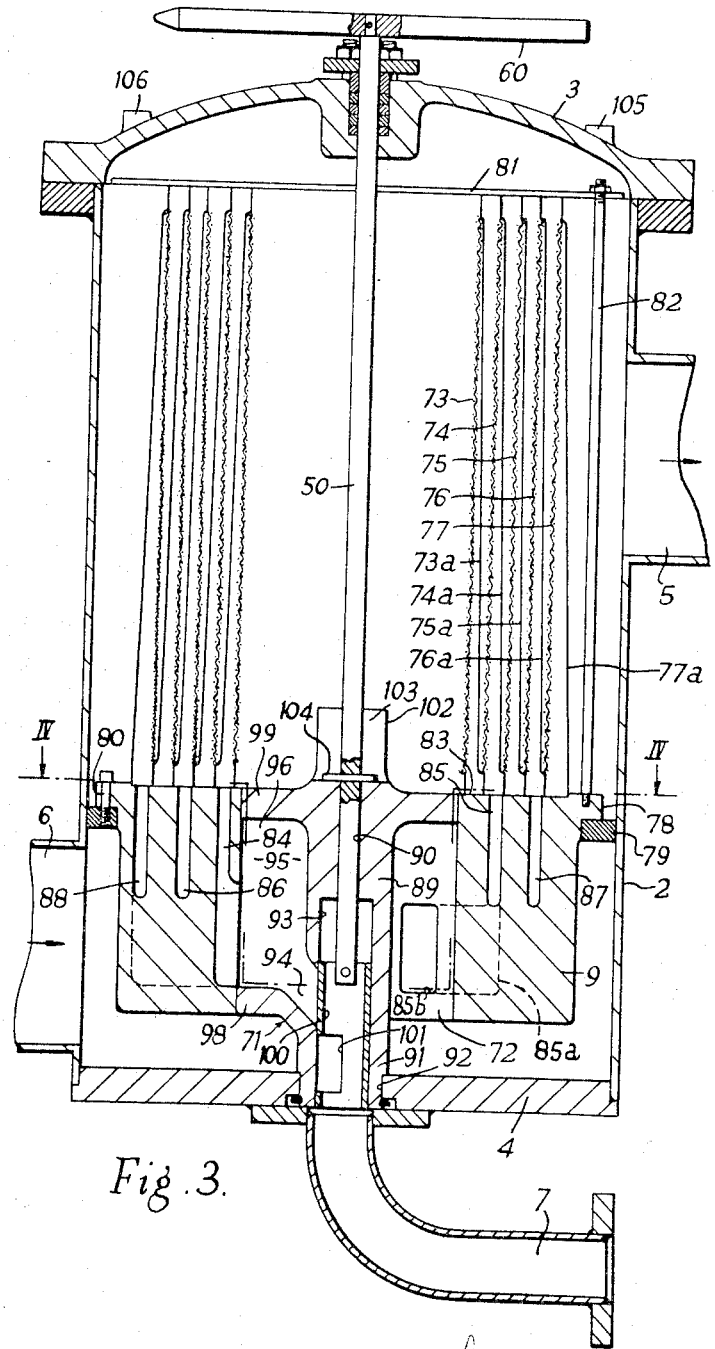

Two embodiments of the invention will now be described by way of example with reference to the accompanying drawings in which:

FIG. 1 is a section on the line II—II of FIG. 2,
FIG. 2 is a section on the line I—I of FIG. 1,
FIG. 3 shows diagrammatically a view similar to FIG. 2 of a modified construction, and
FIG. 4 is a plan view of the valve block of FIG. 3.

Referring to FIGS. 1 and 2 a housing indiated generally at 1 comprises a cylindrical body 2 of circular cross-sectional shape having an open upper end closed by a cover 3 and a closed lower end 4. Towards its upper end the housing is formed with an outlet port 5 and towards its lower end the housing is formed with an inlet port 6 and a reflux port 7. (It will here be appreciated that although for convenience all the ports are shown in the same plane in FIG. 2 the reflux port 7, as shown in FIG. 1 is at right angles to the plane including the inlet and outlet ports 6 and 5.)

At its lower end the housing 2 is formed with a cylindrical machined surface 8 in which a cylindrical valve block 9 of circular cross-sectional shape is a close sliding fit. The block 9 is supported on an annular surface 10 formed in the lower end of the housing and at its upper end a circumferential groove 11 houses a sealing ring 12 in contact with the surface 8.

The upper part of the block 9 is formed with a recess the lower surface 13 of which is formed with four semi-circular grooves 14, 15, 16 and 17 of differing radius. The groove 14 communicates with one end of a passage 18 the other end of which opens at 19 in the peripheral surface of the block 9. Similarly the grooves 15, 16 and 17 respectively communicate with passages 20, 21 and 22 all opening into the peripheral surface of the block 9 at positions mutually at right angles.

A series of cylindrical filter units 23, 24, 25 and 26 of circular cross-sectional shape and differing radius are supported concentrically on the surface 13 of the block 9 so that the lower part of the unit 23 is disposed inwardly of the groove 14, the lower part of the unit 24 is disposed radially between the grooves 14 and 15, the lower part of the unit 25 is disposed radially between the grooves 15 and 16 and the lower part of the unit 26 is disposed radially between the grooves 16 and 17. The units are of woven metal gauze and their lower ends are accurately located by perforated annular spacers 27. The upper ends of the units 23, 24, 25 and 26 are also located by perforated annular spacers 28 secured thereto and a plate 29 formed with perforations 30 is carried centrally of the assembly of units.

A frusto conical metal baffle 31 has its outwardly flared lower end 32 secured to the inner surface of the unit 23 at a position spaced from the lower end thereof. Below this position the unit 23 is formed of solid material without perforations. The upper end of the baffle 31 terminates short of the upper end of the assembly of units and is secured to a plate 33 formed with perforations around its periphery and with a central aperture 34. A frusto-conical baffle 35 is located between the units 23 and 24 and has its outwardly flared lower end 26 secured to the inner surface of the unit 24 at a position below which the unit is imperforate and its upper inwardly turned end 37 is secured to the outer surface of the unit 23 at a position towards the upper end thereof and above which the unit 23 is imperforate.

A similar frusto-conical baffle 38 is located between the units 24 and 25 and has its outwardly flared lower end 39 secured to the inner surface of the unit 25 at a position below which the unit is imperforate and its upper inwardly turned end 40 is secured to the outer surface of the unit 24 at a position towards the upper end thereof and above which the unit 24 is imperforate.

A similar frusto-conical baffle 41 is located between the units 25 and 26 and has its outwardly flared lower end 42 secured to the inner surface of the unit 26 at a position below which the unit is imperforate and its upper inwardly turned end 43 is secured to the outer surface of the unit 25 at a position towards the upper end thereof and above which the unit 25 is imperforate.

A further frusto-conical baffle 44 is disposed externally of the unit 26 with its lower end 45 spaced therefrom by an annular spacer 46 and its upper inwardly turned end 47 secured to the outer surface of the unit 26 at a position towards the upper end thereof and above which the unit 26 is imperforate.

The block 9 is formed in its lower surface with a central recess 48 and with a central aperture 49 communicating between the recess and the surface 13. A rod 50 is formed with an annular shoulder 51 towards its lower threaded end 52. This end is passed through the aperture 49 and the rod is secured firmly to the block 9 by a nut 53. Intermediate its length the rod carries an externally threaded collar 54 secured thereto by a transverse pin 55. A knurled nut 56 is threaded over the collar 54 to engage the upper surface of the plate 29 and to hold the assembly of filter units firmly against the block 9. The upper end 57 of the rod 50 passes through an aperture 58 in the cover 3 and a gland 59 and is provided with an operating handle 60.

A radial aperture 61 is formed in the lower part of the housing 2 to receive as a sliding fit a stud 62 which is urged radially inwardly by a spring 63 acting between the stud and a threaded plug 64. The inner end 65 of the stud 62 is hemispherical for engagement in any one of four conical depressions such as 66 and 67 in the peripheral wall of the block 9. These depressions are located in such circumferential positions that they serve positively to locate the assembly of filter units and the plug with any one of the passages 19, 20, 21 and 22 in communication with the reflux port 7.

As shown most clearly in FIG. 2 of the drawings the wall of the lower end 4 of the housing adjacent the valve block 9 extends radially inwardly at 68 and 69 over most of the axial length of the valve block the inner edges of these extensions bearing against the periphery of the valve block so that any one of the passages 19, 20, 21 and 22 may be placed in communication with the reflux port 7 whilst the remaining passages all communicate with a part annular space 70 substantially surrounding the valve block and opening into the inlet port 6. With the valve block in the position shown in FIGS. 1 and 2 the inlet port 6 communicates with the passages 19, 20 and 22 and thus through the grooves 14, 15 and 17 with the outer surfaces of the units 23, 24 and 26 the inner surfaces of which all communicate with the outlet port 5. The reflux port 7 communicates through the passage 21 and the groove 16 with the outer surface of the unit 25 the inner surface of which communicates with the outlet port 5. Thus liquid to be filtered flows from the inlet through the units 23, 24 and 26 whilst liquid pressure in the outlet port 5 causes a back flow to occur through the unit 25 and the reflux port 7. It will be understood that rotation of the handle 60 to turn the assembly comprising the filter units and valve block 9 enables any one of the units 23 to 26 to be refluxed. It will also be understood that suitable valve means (not shown) may be provided at or in association with the reflux port 7 to render the unit in the "reflux" position inoperative. Alternatively an additional locating depression such as 66 and 67 may be provided in the periphery of the valve block 9 so that the assembly may be located in a position in which all the passages 19 to 22 open into the annular space 70 in communication with the inlet port 6 and the reflux port 7 is blanked off.

FIGS. 3 and 4 of the drawings show a modified construction in which the reflux port 7 communicates through the lower end 4 of the casing 2 with a valve member indicated generally at 71 and rotatable by the handle 60 and the rod 50 around the inner periphery 72 of an annular stationary valve block 9 on which five filter units 73, 74, 75, 76 and 77 similar to the units 23 to 26 of FIG. 1 are mounted. Each unit is associated with a baffle 73a, 74a, 75a, 76a and 77a mounted externally thereof but no baffle is provided within the unit 73.

The annular valve block 9 is formed at its upper end with an outwardly projecting rim 78 by which it is supported on an inwardly projecting shoulder 79 of the housing 2 and secured thereto by bolts such as 80. The upper ends of the units 73 to 77 are located by a perforated top plate 81 secured to the rim 78 by screwed rods such as 82.

Referring to FIG. 4 the block 9 is formed in its upper surface 83 with five semi-circular grooves 84, 85, 86, 87 and 88 of differing radius to register respectively with the spaces between the lower ends of each adjacent pair of units 73 to 77 and between the unit 77 and its associated baffle 77a. The grooves 84 to 88 communicate through passages 84a, 85a, 86a, 87a, and 88a with ports 84b, 85b, 86b, 87b and 88b at equi-spaced intervals around the inner periphery 72 of the annular valve block 9.

The valve member 71 comprises a boss 89 formed with a central aperture 90 through which the lower end of the rod 50 is freely slidable. At its lower end 91 the boss is tubular and is rotatably mounted with suitable liquid tight packing in an aperture 92 of the lower part 4 of the housing 2. At its upper end the tubular part 91 communicates with a blind bore 93 in the boss 89 and through an aperture 94 with a radially extending chamber 95 constituted by side walls 96 and 97, a bottom wall 89 and a top wall 99 which is extended beyond the side walls 96 and 97 to be of circular shape and freely slidable around the inner periphery 72 of the valve block 9. The outermost edges of the side walls 96 and 97 and the bottom wall 98 also slide closely around the inner periphery 72 of the valve block 9. A tubular valve 100 open at both ends and formed with a peripheral port 101 is axially slidable within the tubular part 91 and the blind bore 93 of the boss 89 and is secured to the lower end of the rod 50 so that in the position shown in FIG. 3 the aperture 94 is blocked by the upper part of the valve 100 whereas should the rod 50 be lifted until the port 101 registers with the aperture 94, communication is established between the chamber 95 and the reflux port 7.

The boss 89 is formed with an upwardly extending part 102 having a diametral slot 103 in which a pin 104 passing through the rod 50 is slidable. The upper surface of the cover 3 is provided with indicating ribs such as 105 and 106 to facilitate accurate disposition of the handle 60 as will hereinafter be described.

The operation of the structure of FIGS. 3 and 4 is generally similar to that of FIGS. 1 and 2: the handle 60 is lifted and turned until as indicated by the ribs such as 105 and 106 the chamber 95 registers with the desired one of the ports 84b to 88b. Lifting of the handle 60 places the chamber 95 in communication with the reflux port 7 via the port 101 in the valve 100 and the engagement of the pin 104 within the slot 103 enables turning movement to be imparted to the valve member 71. It will be appreciated that by setting the chamber 95 at a position intermediate the ports 84b to 88b none of the units is connected with the reflux ports even should the handle 60 then be lifted.

The provision of the baffles 31, 35, 38, 42 and 48 in the construction of FIGS. 1 and 2 and the baffles 73a, 74a, 75a and 77a in the construction of FIGS. 3 and 4 not only serves to isolate each filter unit from the next adjacent unit but their particular shape facilitates the cleaning of each filter unit when it is connected to the reflux port as described in the specification of co-pending U.S. application Serial No. 302,975, now abandoned.

I claim:

1. Liquid filtering apparatus comprising a housing, inlet, outlet and reflux ports in the housing, a valve block mounted in the housing, an end face on the valve block, a plurality of annular filtering units arranged one within the other coaxially on said face, one side of each of the units communicating with the outlet port, passages in the valve block which communicate with the other side of said units, a second face on the valve block communicating with the inlet port and into which the passages open, a reflux passage between the reflux port and the second face and rotatable means registering the reflux passage selectively with each said valve block passage at the second face and bringing said other side of each unit selectively into communication with the reflux port or the inlet port.

2. Liquid filtering apparatus according to claim 1 in which the second face is circular-cylindrical and co-axial with the units and the valve block passages each communicates between the end face at locations separated from one another by the units and spaced apart locations at the second face.

3. Liquid filtering apparatus according to claim 2 in which the second face constitutes a bearing surface for rotation between the valve block and the reflux passage and the lateral spacing between the said spaced apart locations on the valve block is greater than the lateral dimension of the reflux passage at the interface with the second face of the valve block.

4. Liquid filtering apparatus comprising a housing, inlet, outlet and reflux ports in the housing, a valve block of circular cross-sectional shape rotatably mounted in the housing, an end face on the valve block, a plurality of annular filtering units arranged one within the other coaxially on said face, one side of each of the units communicating with the outlet port, means for rotating the valve block and passages in the valve block which communicate with the other side of said units and selectively with the inlet port and the reflux port upon rotation of the valve block.

5. Liquid filtering apparatus according to claim 4 comprising a circular recess in the end face coaxial with the filtering units in which the filtering units are secured to rotate with the valve block and releasable means locating the valve block in the housing with the reflux port registering with one of the valve block passages.

6. Liquid filtering apparatus comprising a housing, inlet, outlet and reflux ports in the housing, an annular valve block mounted in the housing, an end face on the valve block, a plurality of annular filtering units arranged one within the other coaxially on said face, one side of each of the units communicating with the outlet port, passages in the valve block which communicate with the other side of said units, a circular-cylindrical bore in the valve block coaxial with the filtering units, a second face defined by the wall of the bore communicating with the inlet and into which the passages open, a valve member rotatably mounted in the bore, an interface between the valve member and the second face, a reflux passage in the valve member communicating with the reflux port and the interface and means operable to rotate the valve member and selectively register the reflux passage with each valve block passage thereby connecting said other side of each filter unit selectively with the reflux or the inlet port.

7. Liquid filtering apparatus according to claim 6 in which the valve member comprises a first chamber communicating with the reflux port and displaceable along the axis of the filter units and the valve block, and a second chamber radially offset from the first chamber and communicating between said interface and the first chamber, axial displacement of the first chamber closing the second chamber off therefrom.

8. Liquid filtering apparatus according to claim 6 comprising a first part of each valve block passage opening into the end face at locations separated from one another by the units and a second part of each valve block passage perpendicular to the first and opening into the second face at locations having a lateral spacing apart which is greater than the lateral dimension of the reflux passage at said interface.

References Cited by the Examiner

UNITED STATES PATENTS

| | | | |
|---|---|---|---|
| 1,784,103 | 12/1930 | Lowen | 210—330 |
| 2,077,589 | 4/1937 | Seaver et al. | 210—330 |
| 2,237,964 | 4/1941 | Haught | 210—333 |
| 2,429,417 | 10/1947 | Magill | 210—333 |
| 2,854,142 | 9/1958 | Baker | 210—332 |

FOREIGN PATENTS 782,561 9/1957 Great Britain.

REUBEN FRIEDMAN, *Primary Examiner.*

F. A. SPEAR, *Assistant Examiner.*